(12) United States Patent
Abraham

(10) Patent No.: US 8,941,076 B2
(45) Date of Patent: Jan. 27, 2015

(54) ENHANCED PHOTON DETECTION FOR SCANNER

(75) Inventor: Doug Abraham, Topsfield, MA (US)

(73) Assignee: Analogic Corporation, Peabody, MA (US)

( * ) Notice: Subject to any disclaimer, the term of this patent is extended or adjusted under 35 U.S.C. 154(b) by 269 days.

(21) Appl. No.: 13/381,838

(22) PCT Filed: Jun. 30, 2009

(86) PCT No.: PCT/US2009/049257
§ 371 (c)(1),
(2), (4) Date: Dec. 30, 2011

(87) PCT Pub. No.: WO2011/002452
PCT Pub. Date: Jan. 6, 2011

(65) Prior Publication Data
US 2012/0112088 A1    May 10, 2012

(51) Int. Cl.
*G01J 1/42*    (2006.01)
*G01T 1/00*    (2006.01)
*G01T 1/17*    (2006.01)

(52) U.S. Cl.
CPC ..................................... *G01T 1/171* (2013.01)
USPC ................... 250/395; 250/336.1; 250/363.04

(58) Field of Classification Search
CPC ........................................................ G01T 1/171
USPC ............................................. 250/395, 336.1
See application file for complete search history.

(56) References Cited

U.S. PATENT DOCUMENTS

| 5,884,234 A * | 3/1999 | Jorion et al. ..................... 702/66 |
| 7,208,739 B1 * | 4/2007 | Yanoff et al. ............ 250/363.09 |
| 2002/0036259 A1 * | 3/2002 | Agam et al. .................. 250/221 |
| 2006/0276706 A1 * | 12/2006 | Klein et al. ..................... 600/407 |
| 2008/0135771 A1 * | 6/2008 | Vydrin et al. ............ 250/370.09 |
| 2009/0039273 A1 | 2/2009 | Tkaczyk et al. |

OTHER PUBLICATIONS

International Search Report cited in related application No. PCT/US2009/049257 dated Sep. 14, 2010.

* cited by examiner

*Primary Examiner* — David Porta
*Assistant Examiner* — Abra Fein
(74) *Attorney, Agent, or Firm* — Cooper Legal Group LLC

(57) ABSTRACT

The techniques described herein provide for correcting for pulse pile-up and/or charge sharing in a radiation scanner (100). It finds particular application with the use of a pixilated radiation detector (116) (e.g., a photon counting detector). A circuit (200), comprising a plurality of comparators (204, 206, 208), is configured to determine the energy spectrum of a pulse produced from a photon strike. If the energy spectrum is greater than the energy range for a pulse produced by a single photon strike given an input spectrum and/or if pulses produced from adjacent pixels have temporal coincidence, pulse pile-up and/or charge sharing may be identified and a correction mechanism/correction factors may be applied to determine an actual number of photons that struck the detector (116).

23 Claims, 8 Drawing Sheets

ENHANCED PHOTON DETECTION FOR SCANNER

BACKGROUND

The present application relates to the field of x-ray and computed tomography (CT). It finds particular application with the use of medical imaging apparatuses that comprise energy resolving detectors. It also relates to security applications and other applications where obtaining information about the energy spectra of detected radiation would be useful.

CT and other radiographic imaging systems are useful to provide information, or rather images, of interior aspects of an object. Generally, the object is exposed to radiation, and an image is formed based upon the radiation absorbed by the interior aspects of the object, or rather an amount of radiation that is able to pass through the object. Highly dense aspects of the object absorb more radiation than less dense aspects, and thus an aspect having a higher density, such as a bone or mass, for example, will be apparent when surrounded by less dense aspects, such as fat tissue or muscle.

The detectors of a radiographic imaging system are configured to convert the radiographic energy that has traversed the object into signals and/or data that may be processed to produce the images. There are numerous detectors that may be utilized depending upon count rates and/or the system's intended application (e.g., medical, security, etc.), for example.

Energy resolving detectors (e.g., photon counting detectors) are used on some radiographic imaging systems, particularly in nuclear medicine applications. Such detectors are comprised of a plurality of pixels that are configured to detect photon strikes, or rather energy transferred to the detector when a photon strike occurs. When a photon strike occurs, the pixel generates a pulse indicative of the photon. Generally, the pulse includes a fast-rising portion followed by a slower decay portion. The generated pulse is then processed, along with other pulses related to other photon strikes, to generate an image of the object under examination.

Energy resolving detectors have numerous benefits over conventional x-ray and CT detectors. For example, energy resolving detectors have a relatively greater sensitivity because the photons comprised within the radiation are counted. Additionally, such detectors are able to provide information about the energy spectra of detected radiation.

While energy resolving detectors have proven useful in a variety of applications, several drawbacks have limited further adoption of these detectors. One of the drawbacks is a phenomenon known as pulse pile-up. Pulse pile-up occurs when two photons strike a pixel in close temporal proximity, causing the pulse of the first photon strike to be combined with the pulse of the second photon strike because the first pulse does not have time to decay before the second photon strike. Thus, a pulse generated from the second photon strike effectively just extends the first pulse. Because the pulse of the second photon strike is combined with the pulse of the first photon strike, the system mistakes the event as a single photon strike. In doing so, the system may mischaracterize the first photon (e.g., assigning it a higher energy spectrum than it actually had) and may not recognize the second photon. Pulse pile-up is of particular concern in CT and x-ray applications that have a relatively high photon count rate because of the increased probability that two photons will strike the same pixel in close temporal proximity.

A second drawback of energy resolving detectors is known as charge sharing. Charge sharing occurs when two or more adjacent pixels generate pulses related to the same photon strike. This generally occurs when the photon strike occurs near the edge of a pixel, and a portion of the charge cloud created by the strike intrudes onto a second pixel (e.g., making it appear as if a separate photon strike has occurred on the second pixel). Since adjacent pixels appear to have endured respective photon strikes, they generate separate pulses, which may mistakenly be interpreted as two or more separate strikes (e.g., instead of a single strike from a (higher energy) photon). Additionally, the system may mischaracterize the photon since the charge is shared amongst two or more pixels (e.g., assigning it a lower energy spectrum than it actually had). To correct for charge sharing, statistical analysis techniques have been used. While such techniques have proven effective at high count rates, at lower count rates, the statistical techniques are less effective because there are fewer photons for the analysis.

SUMMARY

Aspects of the present application address the above matters, and others. According to one aspect, an apparatus is provided. The apparatus comprises an energy resolving detector configured to produce pulses when radiation is detected, and a first circuit configured to identify an energy spectrum of a first pulse and emit a first circuit output indicative of the identified energy spectrum. The scanner also comprises a data acquisition component operably coupled to the first circuit and configured to identify at least one of charge sharing and pulse pile-up based upon the circuit output and to correct for the at least one of charge sharing and pulse pile-up.

According to yet another aspect, a method for determining a characteristic of a photon is provided. The method comprises generating a first and a second pulse when a photon is detected by a pixilated radiation detector. The method also comprises identifying, by a first circuit, a characteristic of the first pulse, and identifying, by a second circuit, a characteristic of the second pulse. The method further comprises combining information related to the identified characteristic of the first pulse and the identified characteristic of the second pulse to determine a characteristic of the photon.

According to another aspect, a method for correcting for pulse pile-up is provided. The method comprises generating a pulse indicative of at least two photons detected by a pixilated radiation detector, and determining an energy spectrum of the pulse. The method also comprises identifying pulse pile-up when the energy spectrum is greater than or equal to the predetermined threshold. The method further comprises correcting for pulse pile-up if pulse pile-up is identified.

According to yet another aspect, an apparatus configured to detect pulse pile-up is provided. The apparatus comprises a circuit, operatively coupled to a pixel of a pixelated radiation detector, and comprising an energy threshold that is greater than an energy spectrum of a pulse produced from a single photon strike given an input spectrum of radiation. The apparatus also comprises a data acquisition component operatively coupled to the circuit and configured to correct for pulse pile-up if the energy spectrum of the pulse is greater than or equal to the energy threshold.

Those of ordinary skill in the art will appreciate still other aspects of the present application upon reading and understanding the appended description.

FIGURES

The application is illustrated by way of example and not limitation in the figures of the accompanying drawings, in which like references indicate similar elements and in which.

DESCRIPTION

Figure 1:
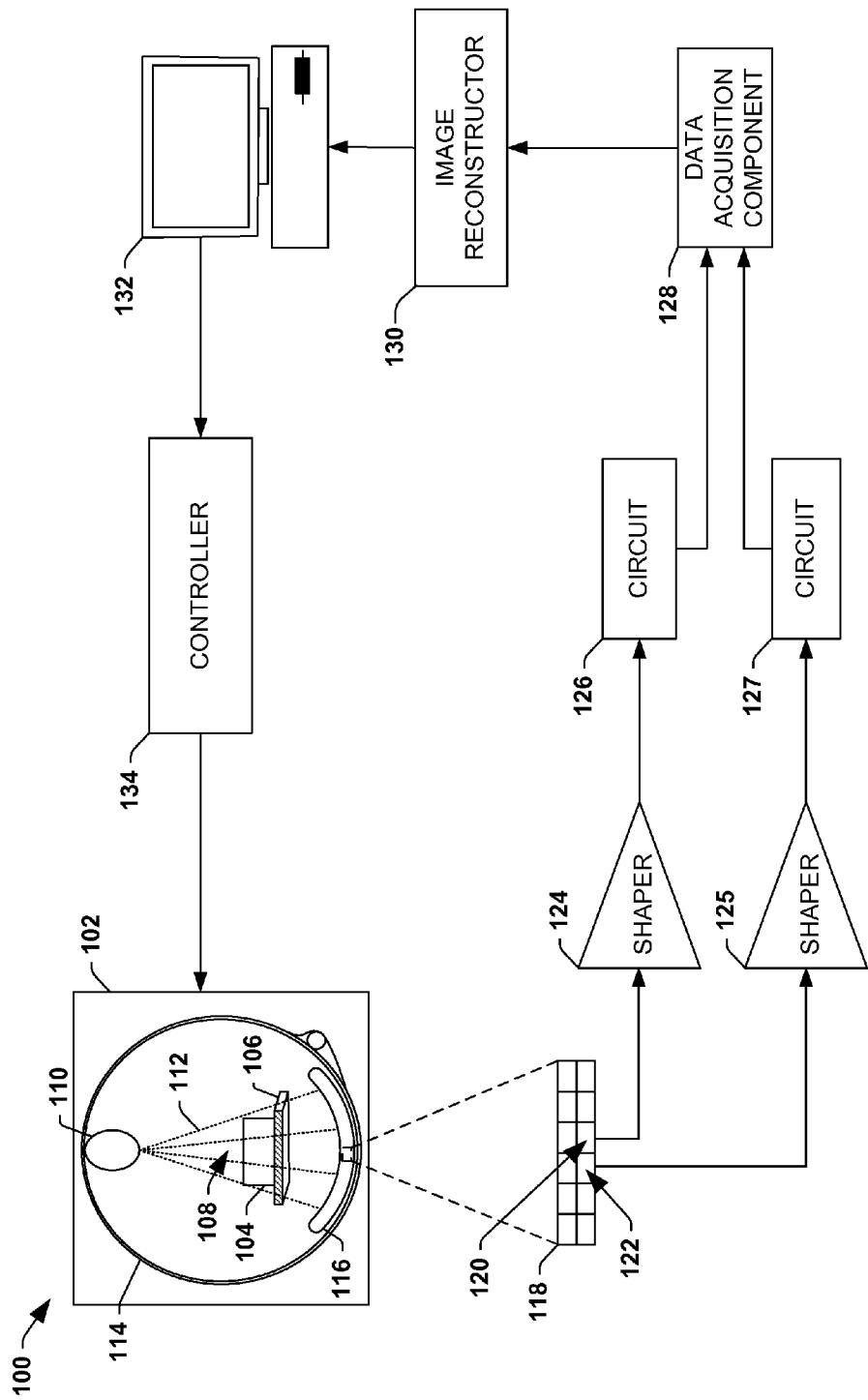
FIG. 1 is a schematic block diagram illustrating an example scanner.

FIG. 1 depicts an example scanner 100. The scanner 100 may be a computed tomography (CT) scanner, a line scanner, or another radiation scanner, for example. Such a scanner 100 may be used in medical, security, and/or industrial applications, for example. An object scanning apparatus portion 102 of the scanner 100 is configured to scan an object 104 under examination (e.g., a human patient, a piece of luggage, a package, etc.). The object 104 is generally placed on a surface 106 (going into and out of the page), such as a bed or a conveyor belt, and selectively positioned in an examination region 108 of the object scanning apparatus 102. Once the object 104 is positioned and/or is moving through the examination region 108, a radiation source 110, such as an ionizing x-ray source, is supplied an input spectrum (e.g., a voltage) which causes fan, cone, wedge, and/or other shaped radiation 112 to be emitted into the examination region 108.

The radiation 112 is comprised of photons. Photons that traverse the object 104 are detected by a detector 116, such as an energy resolving detector (e.g., a photon counting detector), or a pixilated radiation detector, positioned on a substantially diametrically opposing side of the examination region 108 relative to the radiation source 110. The size and/or shape of the detector 116 may depend upon the shape of the emitted radiation (e.g., fan, wedge, etc.), but the detector generally extends in the transverse direction (e.g., towards the left and right edges of the page) and the longitudinal direction (e.g., into and out of the page). Internal aspects of the object 104 (e.g., masses, scar tissue, threat items, etc.) may cause various amounts of photons to traverse the object 104 (e.g., creating areas of high traversal and areas of low traversal within the object 104 under examination).

It will be appreciated that the material of the detector 116 may depend upon the application of the scanner 100. For example, the detector 116 may comprise a direct conversion detector material, such as a crystalline material (e.g., cadmium zinc telluride, cadmium telluride) and/or an amorphous photoelectric material. Alternatively, the detector 116 may comprise a scintillator and a two-dimensional array of photodiodes configured to receive light photons generated by the scintillator in response to radiation 112 from the radiation source 110.

As illustrated by a zoomed in view 118 of a portion of the detector 116, the detector 116 comprises of a plurality of pixels (e.g., 120 and 122). Respective pixels are assigned a geometric position and are configured to detect photons that strike the detector at their assigned positions. The pixels may be configured to emit signals at a normalized energy level (e.g., a baseline), and when a photon is detected by a pixel, the pixel may generate a pulse in the signal that is indicative of the detected photon (e.g., at times with the aid of related (signal conditioning) circuitry). The pulse may indicate that a photon was detected by the pixel, the time at which the photon was detected, and/or the energy spectra of the detected photon, for example.

Pixels of the detector 116 may be in operable communication with a respective pulse shaper (e.g., 124 and 125) configured to shape pulses and/or improve the characteristics of a pulse (e.g., reducing the decay portion of a pulse) using suitable analytical, iterative, or other shaping techniques. In the illustrated example, a first pixel 120 is operably coupled to a first pulse shaper 124, and a second pixel 122 is operably coupled to a second pulse shaper 125. Thus, the first pulse shaper 124 shapes pulses generated by the first pixel 120, and the second pulse shaper 125 shapes pulses generated by the second pixel 122.

Shaped signals may be transmitted to a circuit (e.g., 126 and 127) operably coupled to a respective pulse shaper. That is, the first pulse shaper 124 may transmit shaped pulses to a first circuit 126, and the second pulse shaper 125 may transmit shaped pulses to a second circuit 127. The circuits are configured to identify the energy spectrum of a shaped pulse based upon the characteristics of the pulse ("measured characteristics"). In one example a circuit compares the voltage of a pulse with a plurality of thresholds, to identify the energy spectrum of the pulse. Because the energy spectrum of the shaped pulse is based upon an energy detected by a pixel, an energy spectrum of a photon that struck the pixel and caused the pulse to be generated may also be (indirectly) identified. It will be appreciated that where the scanner 100 does not comprise pulse shapers (e.g., 124 and 125), the circuits (e.g., 126 and 127) may instead identify the energy spectra of pulses based upon unshaped pulses.

The circuit outputs a circuit output indicative which thresholds the pulse's measured characteristics exceeded and/or which thresholds the pulse's measured characteristics did not exceed. For example, the circuit may determine that the pulse's voltage exceeded a pre-established "high" threshold and a pre-established "low" threshold and generate a circuit output which indicates as such.

Circuit outputs may be transmitted to a data acquisition component 128 configured to receive the circuit outputs from one or more circuits (e.g., 126 and 127). Using the circuit outputs from one or more circuits, the data acquisition component 128 counts photons based upon which thresholds were activated and deactivated by the pulse. It will be appreciated as used herein that a threshold that is activated refers to a threshold that has an energy level that is below the energy level of the pulse. Thus a threshold would be activated when the effective keV level of the threshold is 180 keV and the effective keV level of the pulse is 200 keV but would not be activated when the effective keV level of the pulse is 140 keV, for example.

It will be understood to those skilled in the art that there are numerous counting techniques that may used to count photons based upon which thresholds are activated and/or deactivated by the pulse. One technique for counting photons (a saturated topology technique) measures effectively the time interval that a threshold is activated. By measuring that time interval from a plurality of thresholds, it can be determined how many photons are detected and the energy spectrums of respective photons. Another technique for counting photons (a paralyzed topology technique) counts effectively the number of times a threshold becomes activated and/or deactivated.

The data acquisition component 128 is also configured to use the circuit outputs from one or more circuits to correct for charge sharing and/or pulse pile-up. Stated differently, the data acquisition component 128 may be configured to determine whether charge sharing and/or pulse pile-up has occurred based upon the identified energy spectrum of one or more pulses, or based upon which thresholds are activated and/or deactivated for a given pulse within a given (e.g., predetermined, specified, etc.) time frame. If the data acquisition component 128 determines that charge sharing and/or pulse pile-up has occurred within the time frame, the data acquisition component 128 may alter the normal circuit output results, or the number and/or classification of photons (e.g., high energy photons, low energy photons, etc.), to correct for the charge sharing and/or pulse pile-up.

The data acquisition component 128 may also be configured to bin (corrected) circuit outputs from a plurality of circuits (e.g., operably coupled to a plurality of pixels) to generate projection data related to the object 104 under examination. In this way, the data acquisition component 128 may combine pulses yielded from photons that impinged small fragments of the object 104 to generate projection data related to a larger picture of the object 104.

The example scanner 100 also comprises an image reconstructor 130 that is operably coupled to the data acquisition component 128 and configured to receive the projection data and generate one or more images indicative of the object 104 using a suitable analytical, iterative, and/or other reconstruction technique (e.g., tomosynthesis reconstruction).

The images may be presented in human perceptible form on a monitor 132 for human observation. In one embodiment, the monitor 132 displays a user interface, and a computer, connected to the monitor 132, is configured to receive human input. The received input may be transmitted to a controller 134 configured to generate instructions for the object scanning apparatus 102. For example, a package inspector may want to rescan the object 104, and the controller 134 may thus instruct the surface 106 (e.g., a conveyor belt) to reposition the object 104 in the examination region 108.

Figure 2:
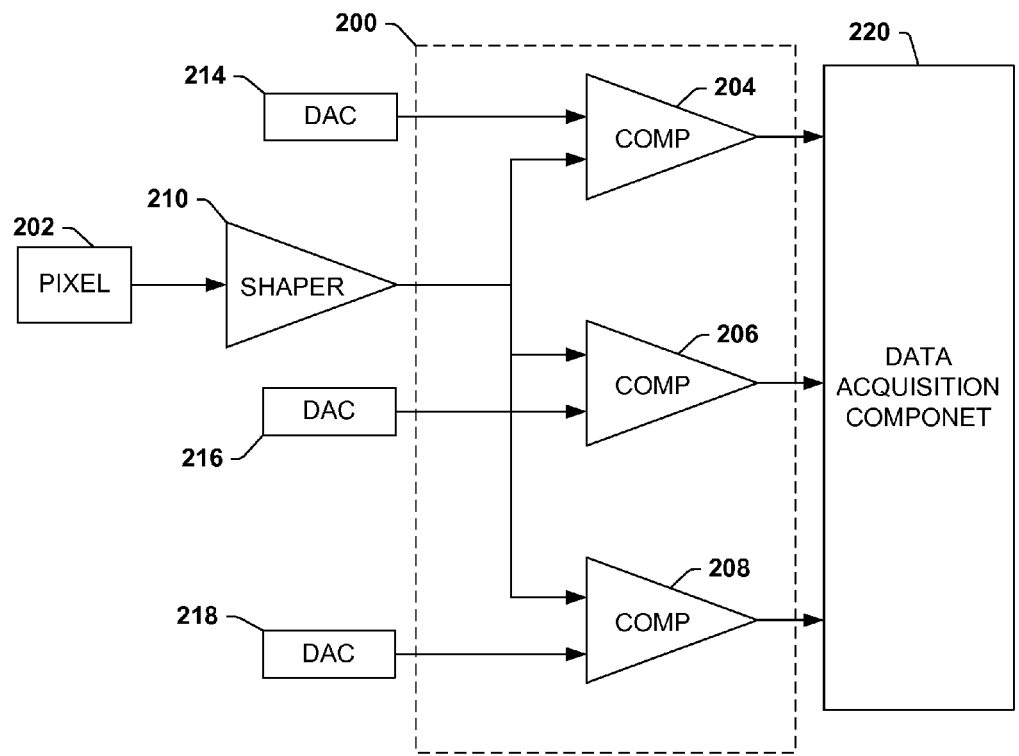
FIG. 2 illustrates an example circuit.

FIG. 2 illustrates an example circuit 200 (e.g., 126 in FIG. 1). The circuit 200 may be configured to determining, or identify, the energy spectrum of a pulse generated by a pixel 202 (e.g., 120 in FIG. 1) of a detector (e.g., 116 in FIG. 1) when a photon strikes the pixel 202. The circuit 200 is also configured to output a circuit output indicative of the identified energy spectrum, or indicative of the thresholds that a pulse activated and/or the thresholds that a pulse deactivated. It will be appreciated that determining the energy spectrum of the pulse (and therefore the energy spectrum of the photon) may be useful for (later) determining whether two or more photons struck the pixel 202 in close temporal proximity (e.g., causing pulse pile-up) and/or whether a photon's charge was shared with one or more pixels adjacent the pixel the photon struck because two pixels in close spatial proximity detected charge and emitted a pulse in close temporal proximity (e.g., charge sharing occurred).

As discussed with respect to FIG. 1, the pixel 202 is configured to generate a pulse in response to a photon that strikes the pixel 202, or rather a photon's charge that is detected by the pixel 202. A pulse generated by the pixel 202 may be transmitted to a pulse shaper 210 that shapes the pulse using techniques known to those skilled in the art.

The shaped pulse may be transmitted to the circuit 200. The circuit 200 may comprise one or more comparators (e.g., 204, 206, and 208) configured to receive the shaped pulse and compare the voltage of the shaped pulse to a signal with known characteristics (e.g., a known threshold voltage). In the illustrated example, the signal with known characteristics is emitted from a digital/analog converter (DAC) (e.g., 214, 216, 218). For example, a first DAC 214 may be configured to emit a signal that has an effective kiloelectron volt (keV) level of 180 keV. In this way, a first comparator 204 (e.g., receiving signals emitted from the first DAC 214) may compare the 180 keV signal with the shaped pulse, which has unknown characteristics, to determine whether the shaped pulse has an effective kiloelectron volt level greater than 180 keV.

It will be appreciated that by using at least two comparators, the circuit 200 may distinguish pulses generated by photons with various energy spectrums (e.g., high vs. low energy photons). For example, when two comparators are present in the circuit 200, a first comparator may be configured to indicate that the pulse's energy exceeds a low threshold (e.g., indicative photon) while a second comparator may be configured to indicate that the pulse's energy exceeds a higher threshold (e.g., indicative of a high energy photon). A pulse that has an energy exceeding the low threshold, but not the higher threshold may be indicative of a low energy photon strike, while a pulse that has an energy exceeding the low threshold and the high threshold may be indicative of a high energy photon strike, for example.

In one embodiment, the circuit 200 comprises at least three comparators. This may promote the identification of pulse pile-up and/or charge sharing, for example. In the illustrated example, the comparators 204, 206, and 208 are respectively coupled to a DAC 214, 216, or 218 configured to emit a signal with known characteristics. Respective comparators may be configured to emit signals with different characteristics (e.g., voltages) to create various thresholds. For example, the first DAC 214 may emit a signal with an effective keV level of 180 keV while a second DAC 216 emits a signal with an effective keV level of 90 keV and a third DAC 218 emits a signal with an effective keV level of 60 keV.

It will be appreciated that the characteristics of the signals emitted by the DACs 214, 216, and 218 will vary depending upon an input spectrum (e.g., a voltage supplied to a radiation source), an intended application (e.g., mammography, cardiology scans, etc.) and/or a count rate of the photons. For example, at low count rates, detection of charge sharing may be more important than detection of pulse pile-up so the characteristics of the signals emitted by the DACs (e.g., the voltages chosen) may be be better suited for identification of energy spectra useful for identifying charge sharing. At high count rates, detection of pulse pile-up may be more beneficial than detection of charge sharing (e.g., because the effects of charge sharing may be reduced by statistical analysis) so the characteristics of the signals emitted by the DACs may be better suited for identification of energy spectra that are useful for identifying pulse pile-up.

In another embodiment, the circuit 200 comprises at least four comparators. As will be better appreciated from the following discussion, in this way, the comparators may be thresholded at levels that may assist in identifying the energy spectrum of the pulse and/or promote the identification of both pulse pile-up and charge sharing. Stated differently, by adding more comparators (which utilize (optimum) thresholds), the accuracy of the corrected results for pile-up and for charge sharing may increase. For example, one comparator may be thresholded above an energy level attainable by a pulse indicative of a single (high energy) photon strike (e.g., thresholded to identify pulse pile-up) given the input spectrum supplied to the radiation source (e.g., 110 in FIG. 1), a second comparator may be thresholded at a level indicative of a high energy photon, a third comparator may be thresholded at a level indicative of a photon, and a fourth comparator may be thresholded at a level between the level indicative of a high energy photon and the level indicative of a photon.

It will be appreciated that using comparators to identify the energy spectra of pulses, and therefore the energy spectra of photons, is an example mechanism for the identification. Other mechanism known to those skilled in the art for identifying the energy spectra of pulses are also contemplated. For example, the circuit may comprise gates, op amps, and/or other circuitry that may be useful for identifying the energy level or energy spectrum of pulses.

Figure 3:
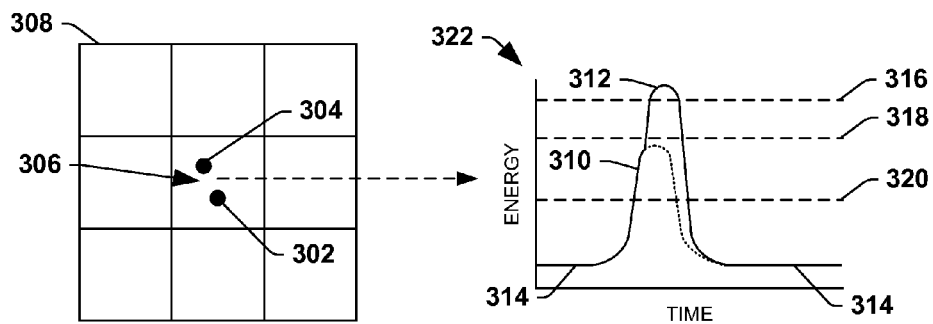
FIG. 3 illustrates example diagrams of pulse pile-up.

FIG. 3 illustrates example diagrams of pulse pile-up. Pulse pile-up occurs when two or more photons (e.g., 302 and 304) strike a pixel 306 (e.g., 202 in FIG. 2) of a detector 308 (e.g., 116 in FIG. 1) in close temporal proximity. As illustrated in graph 322, the pixel 306 emits a first pulse 310 when the first photon 302 strikes the pixel 306 and a second pulse 312 when a second photon 304 strikes. Unfortunately, because the first photon 302 and the second photon 304 struck in close temporal proximity, the first pulse 310 was unable to return to a normalized energy level 314 (e.g., a clear condition) before the second photon 304 struck. Therefore, the second pulse 312 was added to the first pulse 310, causing pulse pile-up.

It will be appreciated that the lines 316, 318, and 320 may represent various energy thresholds of comparators (e.g., 204, 206, and 208 in FIG. 2). For example, a first line 316 may represent a threshold above the maximum pulse energy that may be generated by a (high energy) photon strike given an input spectrum (e.g., voltage) that is supplied to a radiation source emitting the photon, a second line 318 may represent a high threshold (e.g., a pulse exceeding the high threshold is indicative of a high energy photon within the given input energy spectrum), and a third line 320 may represent a low threshold (e.g., a pulse exceeding the low threshold is indicative of a photon rather than noise). It will be appreciated that the first pulse 310, by itself, did not cross the second line 318. Therefore, the first pulse 310 was generated based upon a low energy photon strike. However, because the first pulse 310 was combined with the second pulse 312 (e.g., because the two photons 302 and 304 struck the same pixel 306 in close temporal proximity) the combined pulse would have been identified as being generated by a high energy photon if there were no comparators above the maximum pulse energy that may be generated by a photon given the input spectrum (e.g., because the combined pulse exceeded the second line 318).

It will be appreciated that by using at least three comparators, at least one of which is thresholded above the maximum input spectrum pulse energy that may be generated by a high energy photon strike, the circuit may identify an energy spectrum that is greater than what is attainable by a single photon given the input spectrum. Using this information, a data acquisition component (e.g., 128 in FIG. 1) may identify pulse pile-up and correct circuit output to reflect two photon strikes (e.g., causing two photon strikes to be counted instead of one) when the a threshold above the maximum pulse energy that may be generated by a photon is activated (e.g., the peak of the combined pulse goes above the first line 316).

It will be appreciated that by using only three comparators, the data acquisition component may be unable to discriminate whether the pile-up involves two or more photon strikes and/or may be unable to determine the energy spectra of the two or more photons strikes. Therefore, additional comparators, thresholded above the first line 316, may be useful for determining how many photons are involved in the pile-up and/or for determine the energy spectra of the photons. For example, where a fourth line (not shown) is included above the first line 316, and the peak of the combined pulse falls between these (first and fourth) thresholds, the circuit may be able to more accurately determine that the combined pulse is indicative of two low energy photon strikes. Similarly, where a fifth line (not shown) is included above the fourth line, and the peak of the combined pulse falls between these (fourth and fifth) thresholds, the circuit may be able to more accurately determine that the combined pulse is indicative of one high energy and one low energy photon strike.

Figure 4:
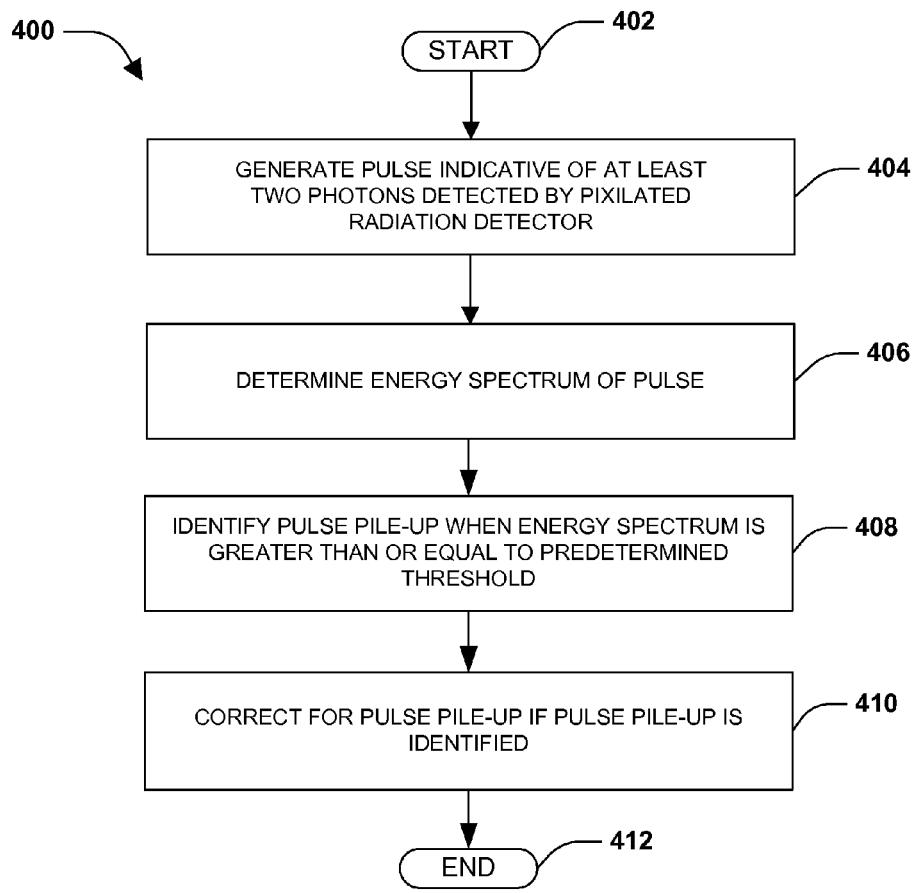
FIG. 4 is a flow diagram illustrating an example method for correcting for pulse pile-up.

FIG. 4 is an example method 400 for determining pulse pile-up (e.g., using scanner 100 in FIG. 1). The method begins at 402, and a pulse indicative of at least two photons detected by a pixilated radiation detector is generated at 404. The pulse may be indicative of two photons because both photons struck a pixel of the pixilated radiation detector in close temporal proximity, for example. That is, the two photons may have struck in such close temporal proximity that that detector, or rather a pulse emitted from the detector when the first photon struck, was unable to return to a normalized energy level (e.g., a state that is present when no photons are detected) before the second photon struck. Therefore, the pulse generated by the first photon and the pulse generated by the second photon may be combined, creating a single, higher energy pulse (e.g., relative to the pulses that would have been generated from either the first or the second photon strike alone).

At 406, an energy spectrum of the pulse is determined. In one example, the energy spectrum is determined by comparing the voltage of the pulse to one or more predefined thresholds. The energy spectrum is identified based upon which thresholds the voltage of the pulse exceeds and which thresholds the voltage of the pulse does not exceed. A circuit output may be generated from the comparison of the thresholds to the pulse and may indicate the results of the comparison. For example, the circuit output may indicate that the voltage of the pulse exceeded the first and second thresholds, but not the third threshold. In this way, it can be determined that the photon has an energy spectrum that is between the energy levels of the second and third thresholds.

At 408, pulse pile-up is identified when the energy spectrum of the pulse exceeds a predefined threshold. The predefined threshold is generally greater than an energy spectrum of a pulse that may be produced when a single photon is detected for a given input spectrum (e.g., voltage to a radiation source emitting the photon). For example, if the pulse produced by a single photon strike may have an effective keV range the between 10 and 60 keV, the predefined threshold may be set to a voltage that produces an effective keV level of 70 keV. It will be appreciated that the energy spectrum for a single photon may differ depending upon the input supplied to the radiation source. Thus, the value, or energy, of the predefined threshold is dependent upon the input to the radiation source.

At 410, pulse pile-up is corrected. Generally, one photon is counted per pulse. However, when pulse pile-up occurs, a single pulse may be generated from more than photon. That is, the pulse from a first photon strike and the pulse from a second photon strike may be combined to generate a higher energy combined pulse relative to the energy of either pulse by itself. Pulse pile-up is corrected by counting more than one photon strike when a data acquisition component (e.g., 128 in FIG. 1), for example, recognizes that the (combined) pulse is indicative of a plurality of photon strikes (e.g., instead of only counting one photon for every pulse generated).

One way to correct the number of photons counted is to apply a correction factor to data yielded from the circuit output that is produced when the energy spectrum of the pulse is determined. Stated different, the circuit output may comprise responses (e.g., signals, data, etc.), yielded from a plurality of comparators (e.g., as depicted in FIG. 2), which the data acquisition component, for example, uses to generate data indicative of the photons counted, or rather the number of photons counted. One or more correction factors may be applied to this data. In this way, the data acquisition component, for example, may more accurately count the number of photons that have been detected (e.g., relative to counting one photon per pulse). A more accurate count may, for example, improve the image that a scanner (e.g., 100 in FIG. 1) produces and/or may reduce the artifacts in the image. A more accurate count may also allow the photon count rate (e.g., the number of photons emitted from the radiation source) to be increased (e.g., 11 fold) while maintaining the image quality produced by currently used scanners.

It will be appreciated that the values of the correction factors may be a function of the conversion material of the pixelated detector and/or shaper impulse responses, for example. Where the conversion material causes the pulse, or signal, to return to a normalized energy level (e.g., a clear condition) substantially instantaneously after a photon strikes the detector, the correction factor may be less than a correction factor used when a conversion material that takes longer to return to a normalized energy level, for example. Similarly, if a shaper can shape the pulse such that the decay portion of the pulse is small, the correction factor may be less than a correction factor used when decay portion is larger.

The method ends at 412.

Figure 5:
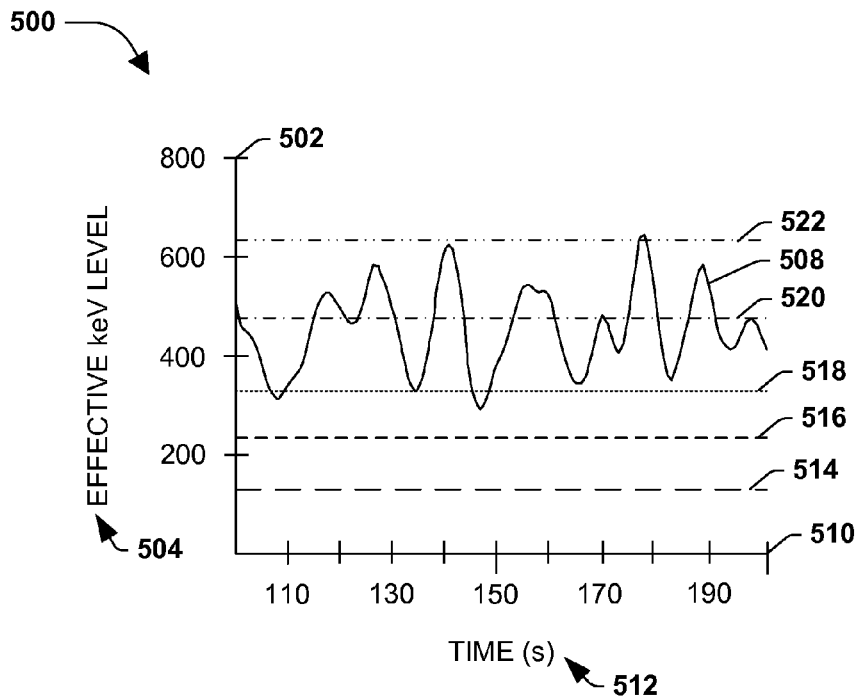
FIG. 5 illustrates an example graph depicting pulse pile-up.

FIG. 5 depicts a graph 500 illustrating the effects of pile-up for a given circuit topology. The y-axis 502 of the graph 500 represents the effective keV level 504 of a signal 506 (e.g., the solid line) emitted from a pixel (e.g., 202) as a plurality of photons (represented by pulses in the signal 506) strike the pixel. The x-axis 510 represents time 512. The graph 500 also illustrates five thresholds (represented by horizontal lines) that may be used to determine the energy spectra for various photons. A first threshold 514 is at a level configured to distinguish a photon from noise, a second threshold 516 is at a level configured to distinguish a high energy photon from a low energy photon, and a third 518, a fourth 520, and a fifth 522 threshold are at levels above an energy level attainable by a single photon given an input spectrum. Thus, the third 518, fourth 520, and fifth 522 thresholds are used to identify pulse pile-up and/or to determine the energy spectra of photons that have been detected in such close temporal proximity that pulse pile-up has occurred.

As illustrated, the signal 508 remains above the first 514 and second 516 thresholds for the period of time that is depicted in the graph 500. Therefore, the first 514 and second 516 thresholds are effectively constantly activated. In the prior art (with no thresholds above a level achievable by a single photon given an input spectrum (e.g., the third 518, fourth 520, and fifth 522 thresholds are absent)), a data acquisition component either would count a plurality of high energy photons (if a saturated topology technique was used for counting) because the energy of the signal 508 remains above the second threshold 516 for the length of time depicted or would count no photons (if a paralyzed topology technique was used for counting) because the signal's energy never drops below the energy level of the second threshold 516 and therefore never deactivates the second threshold 514.

Placing thresholds above an energy level attainable by a single photon allows the data acquisition component to count multiple photons from a single pulse of the signal and/or to determine characteristics of the multiple photons represented by the single pulse. For example, if the third threshold 518 is at a level just above the level attainable by a single photon (and therefore indicative of at least two photons) and the fourth threshold 520 is at a level indicative of both low energy photon and a high energy photon strike, the data acquisition component may count photons when the third threshold 518 is activated and may identify both of those photons as low energy photons if the pulse's energy is less than the energy level of the fourth threshold 520. If the pulse's energy is greater than the energy level of the fourth threshold 520, the data acquisition component may count two photons, at least one of which is a high energy photon. Thus, the threshold's above an energy level that is attainable by a pulse from a single photon strike allows the data acquisition component to identify pulse pile-up (when the third 518, fourth 520 and/or fifth 522 thresholds are activated) and/or to correct for the pulse pile-up (by counting multiple photons as associated with a pulse and/or by identifying the energy spectra of the multiple photons counted).

Figure 6:
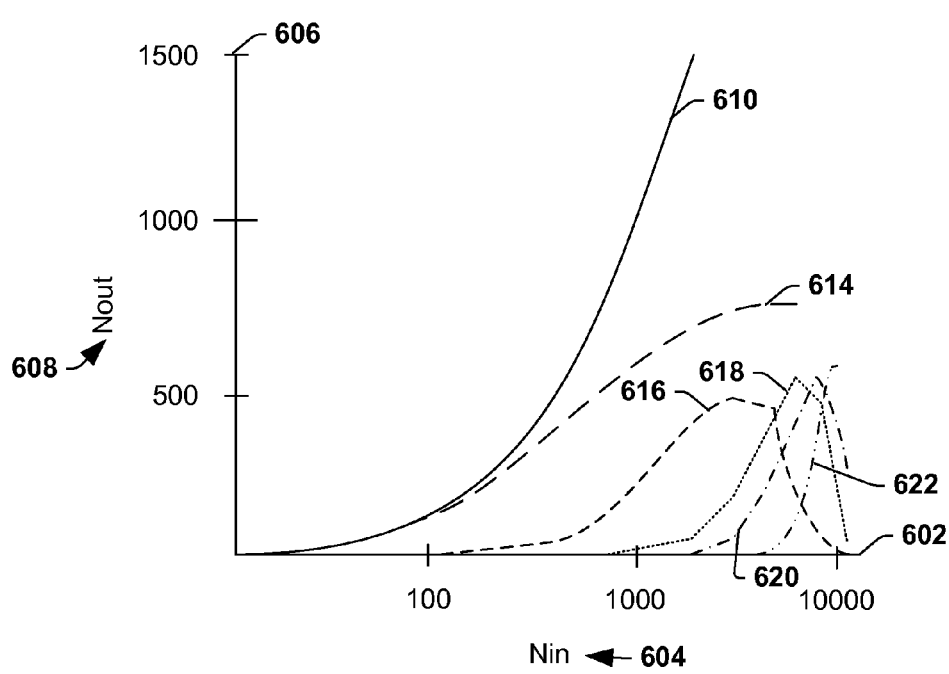
FIG. 6 illustrates an example graph of a distribution of the number of photons that would be counted if there was no pulse pile-up correction relative to a count rate of emitted photons.

FIG. 6 is an example graph 600 of a distribution of the number of photons that would be counted (because thresholds are triggered) if there was no pulse pile-up correction relative to the count rate of emitted photons, or the number of photons detected. The log x-axis 602 represents the count rate of emitted photons 604 and the y-axis 606 represents the number of photons that would be counted 608. The solid line 610 represents an ideal count rate where the number of photons that are detected is equal to the number of photons that are counted. That is, the solid line 610 represents the number of photons that would be counted if there no pulse pile-up existed. For example, if 1000 photons are detected, 1000 photons would be counted.

Due to pulse pile-up less than all of the photons that are detected will be counted unless there is a correction for pulse pile-up. Pulse pile-up occurs because the signal cannot reach a normalized energy level (e.g., a level below the first threshold 514 in FIG. 5) before a second photon strikes the same pixel and causes a pulse generated from the second strike to be contributed to a pulse from the first spike. As illustrated in the graph (e.g., by the divergence lines 614, 616, 618, 620, 622 from the solid line 610), pulse pile-up occurs more frequently at high count rates (e.g., when a high number of photons are detected) than at lower count rates (e.g., when fewer photons are detected).

The lines 614, 616, 618, 620, and 622 represent the number of photons that would be counted by a data acquisition component (e.g., 128 in FIG. 1) based upon the activation/deactivation of a respective threshold. For example, a first line 614, represents the number of photons that would be counted (using a saturated topology technique) when a first threshold (e.g., 514 in FIG. 5) is activated/deactivated. As illustrated, at count rates below 100, the first threshold activates/deactivates appropriately (e.g., the signal has time to return to a normalized energy level before a second photon strike occurs, the signal remains above the first threshold but a second pulse does not contribute to a first pulse in a way that causes the signal to remain above the threshold for a shorter period of time than it would if there was no pulse pile-up (e.g., the pulses are spread out rather than stacked on top of one another)), causing the data acquisition component to count substantially all of the photons detected. However, at count rates above 100, the first line 614 diverges from the solid line 610 because pulse pile-up is causing the first threshold not to activate/deactivate appropriately. At count rates above 5000, the first line 614 levels off because the saturated topology technique causes the data acquisition component to count a substantially constant rate of photons because pulse pile-up causes the signal to stay above the first threshold.

Lines 616, 618, 620, and 622 represents that number of photons that would be counted (using a paralyzed topology technique) when a second (e.g., 516 in FIG. 5), third (e.g., 518 in FIG. 5), fourth (e.g., 520 in FIG. 5) and fifth (e.g., 522 in FIG. 5) threshold, respectively, are activated. The second threshold is thresholded at a level above a level attainable by a single photon at a given input spectrum. Thus, the threshold is only activated/deactivated when two or more pulses have "piled-up." As illustrated by the second line 616, pulse pile-up occurs at a count rate of approximately 100 and the number of photons counted as a result of the activation/deactivation of the second threshold continues to rise until a count rate of approximately 3000. However, at count rates above 3000, the second threshold does not activate/deactivate appropriately and the number of photons counted drops. This is because, in a paralyzed topology technique, the activations/deactivations of a threshold are counted to determine the number of photons that are counted. At high count rates, a plurality of pulses are "piled-up" and thus the signal's energy level stays above the energy level of the second threshold. Since the energy level of the signal stays above the second threshold, the second threshold not to deactivate (e.g., it is always activated so there are no activations/deactivations to count).

The third threshold may be thresholded at a level above a level attainable by two photons at a given input spectrum. Thus the threshold is only activated/deactivated when three or more pulses have "piled-up." As illustrated by the third line 618, pulse pile-up of three of more photons begins at a count rate of approximately 900 and the third threshold continues to activate/deactivate appropriately until a count rate of approximately 8000. At count rates above 8000, the third threshold does not activate/deactivate appropriately (e.g., the signal is above the threshold for too long because of pulse pile-up) and the data acquisition component begins to count less photons because of the paralyzed counting technique used to count photons.

Similar to the second 616 and third 618 lines, the fourth 620 and fifth 622 lines illustrate counting trends with a fourth threshold (thresholded above the third threshold) and a fifth threshold (thresholded above the fourth threshold), respectively.

If the data acquisition component counts the number of photons from respective thresholds as shown in the graph 600, a factor may be applied to the respective counts to determine the total number of photons that are counted. For example, if the count rate is 1000, the data acquisition component may apply correction factors to the number of photons counted from outputs of the first, second, and third thresholds to determine the total number of photons counted. Stated differently, $N_{out}=K_1*T_1+K_2*T_2+K_3*T_3+K_n*T_n$ where $N_{out}$ is the total number of photons counted; $K_1$-$K_n$ are correction factors; $T_1$ is the value of $N_{out}$ at point along the first line 614 that intersects an imaginary (vertical) line (e.g., a line drawn vertically from $N_{in}=1000$); $T_2$ is the value of $N_{out}$ at a point along the second line 616 that intersects the imaginary line; and $T_3$ is the value of $N_{out}$ at a point along the third line 618 that intersects the imaginary line. It will be appreciated "n" may be any integer greater than 0 but is generally not greater than the number of thresholds that a signal is compared to.

The values of the correction factors ($K_1$-$K_n$) may depend upon the input spectrum of a radiation source and/or the topology technique used to count photons (e.g., saturated, paralyzed, etc.). For example, the correction factors may be greater when a "high" input spectrum is applied to the radiation source relative to the correction factors used when a "low" input spectrum is applied to the radiation source.

It will be appreciated that when a threshold is not activated by a pulse, a portion of the circuit output indicative of the deactivated threshold may output a circuit output of zero, or may not output a circuit output. Thus, the "T" value would be zero and error would not be introduced into the data acquisition component's count. Stated differently, when a threshold does not detect pile-up, no error may be introduced into a photon count and the image quality resulting from the photon count may be improved, for example.

Figure 7:
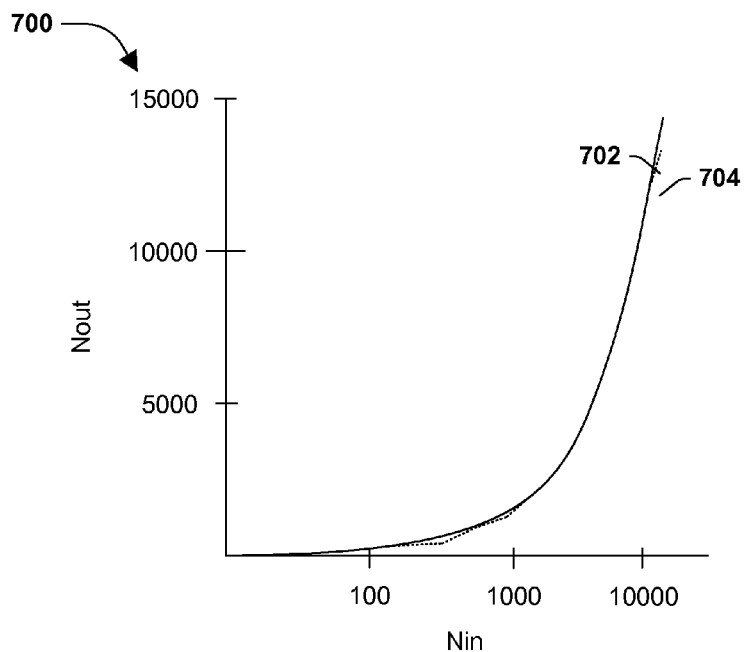
FIG. 7 illustrates an example graph of a distribution of the number of photons counted after a pulse pile-up correction is applied relative to a count of emitted photons.

FIG. 7 is an example graph 700 a distribution of the number of photons that would be counted (because thresholds are triggered) if pulse pile-up is corrected (as disclosed herein) relative to the count rate of emitted photons, or the number of photons detected. The solid line 702 represents an ideal count rate where the number of photons that are detected is equal to the number of photons that are counted. That is, the solid line 702 represents the number of photons that should be counted if pulse pile-up does not occur. The dotted line 704 represents the actual number of photons that are counted after a pulse pile-up correction is applied to the data (by the data acquisition component). It will be appreciated that there is little deviation and thus the dotted line 704 is behind, or covered up by, the solid line 702 in some portions of the graph.

It will be appreciated that the correction may be applicable to both single and multi-energy scanners. In one example, the distribution in FIG. 6 is shifted to the left at high input spectrums, but the same correction factors may be used. However, to improve the ratio of the counted photons to the detected photons with multi-energy scanners, the correction factors used when a first (low) input is applied to a source may be different than the factors used when a second (higher) input is applied to the same or different source.

Figure 8:
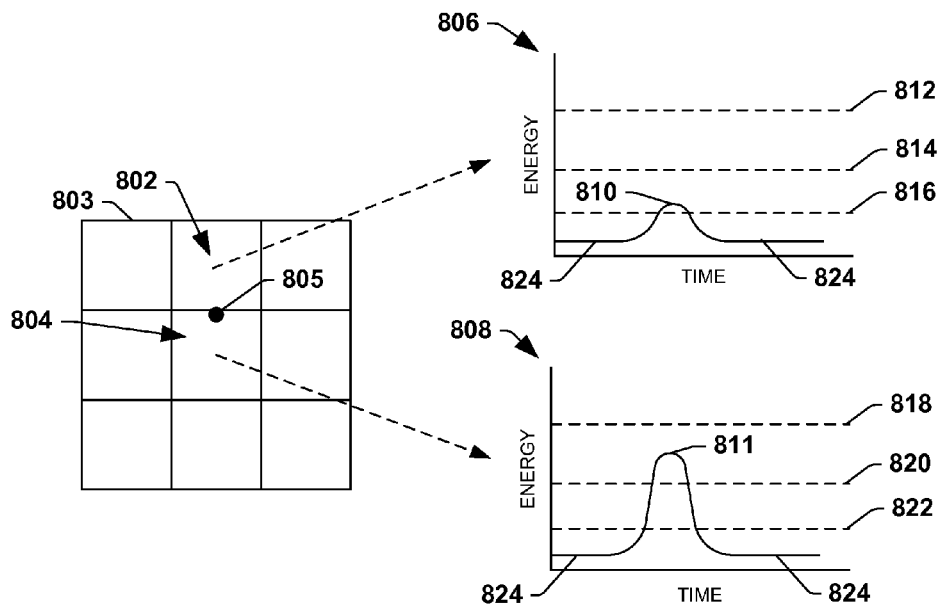
FIG. 8 illustrates example diagrams of charge sharing.

FIG. 8 illustrates example diagrams of charge sharing. Charge sharing occurs when two or more adjacent pixels (e.g., 802 and 804) of a detector 803 (e.g., 116 in FIG. 1) detect a single photon 805 strike because the photon 805 strikes near the border of the two or more pixels (e.g., causing the photon's energy to be dispersed to the two or more pixels). Therefore, the first pixel 802 generates a first pulse 810 (e.g., as illustrated in the first graph 806) and the second pixel 804 generates a second pulse 811 (e.g., as illustrated in the second graph 808). The first pulse 810 may be transmitted to a first circuit (e.g., 126 in FIG. 1) operatively coupled to the first pixel 802 (e.g., 120 in FIG. 1), and the second pulse 811 may transmitted to a second circuit (e.g., 127 in FIG. 1) operatively coupled to the second pixel 804 (e.g., 122 in FIG. 1). Unfortunately, such an event may cause a data acquisition component (e.g., 128 in FIG. 1) to believe two strikes have occurred (e.g., because two pixels generate a pulse in response to the strike) and/or to mischaracterize the photon as having a lower energy than it actually did (e.g., because the charge is spread across a plurality of pixels).

It will be appreciated that the lines 812, 814, and 816 may represent various energy thresholds of the first circuit and lines 818, 820, and 822 may represent various thresholds of the second circuit. For example, a first set of lines 812 and 818 may represent a high threshold (e.g., wherein a high energy photon is identified if the energy of the pulse is greater than the threshold), while a second set of lines 816 and 822 may represent a low threshold (e.g., wherein a photon is identified if the energy of the pulse is greater than the threshold). A third set of lines 814 and 820 may represent a middle threshold that is between the high threshold and the low threshold. In this way, the energy spectrum of the pulse (and indirectly the photon) may be better approximated relative to an approximation when one or two thresholds. As discussed below, comparing a pulse to three or more thresholds may allow the data acquisition component to more easily identify charge sharing and/or correct for charge sharing if it is identified.

In the illustrated example, the first pulse 810 has an energy exceeding the low threshold (e.g., represented by the second line 816) and therefore will be counted as a photon with a low energy spectrum. The second pulse 811 has an energy exceeding both the low threshold (e.g., represented by line 822) and the middle threshold (e.g., as represented by the third line 820). Therefore, the second pulse 811 is indicative of a photon with a higher energy than that of a low energy photon but lower than that of a high energy photon (e.g., a middle energy photon). Assuming photon 805 is a high energy photon, the data acquisition component would mischaracterize the photons based upon information from the first pulse 810 and the second pulse 811 by counting two photon strikes, a low energy photon strike and a middle energy photon strike. However, by combining the information from the first pulse 810 and the second pulse 811 (e.g., provided to it by the first and second circuits, respectively), the data acquisition component may recognize charge sharing and reclassify the photon as a high energy photon (e.g., by adding 810 and 811 so that the sum exceeds a high threshold, such as 812 and/or 818).

Figure 9:
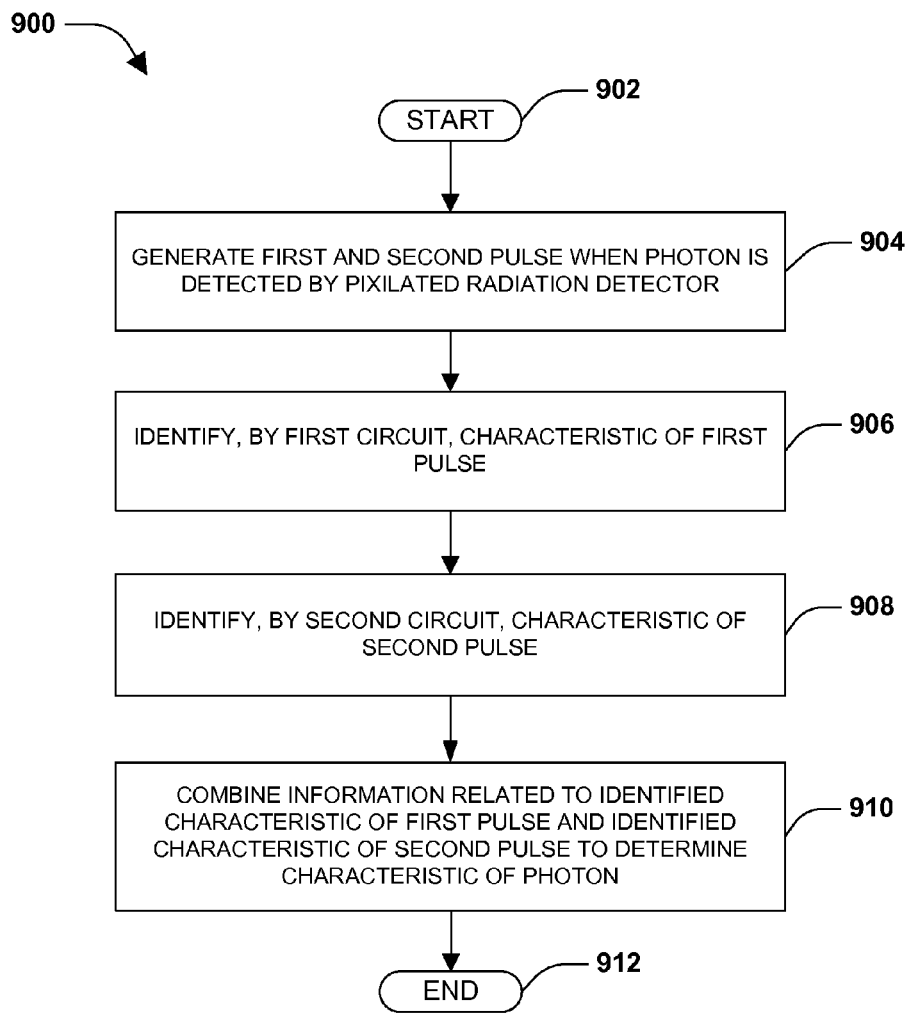
FIG. 9 is a flow diagram illustrating an example method for determining a characteristic of a photon.

FIG. 9 illustrates an example method for correcting for charge sharing. The method begins at 902, and a first and a second pulse are generated when a photon is detected by a pixilated radiation detector at 904. The first pulse may be generated by a first pixel of the pixilated radiation detector, and the second pulse may be generated by a second pixel that is adjacent the first. It will be appreciated that, generally, a photon strike causes a single pixel to produce a pulse. However, if the photon strikes a portion of the pixel that is in close spatial proximity to one or more adjacent pixels, the adjacent pixels may also detect the charge emitted from a single photon strike, and thus a single photon strike may cause two or more pulses to be generated.

At 906, a first circuit identifies a characteristic of the first pulse, and a second circuit identifies a characteristic of the second pulse at 908. In one example, the identified characteristic is the energy level, or voltage of the first and second pulses, respectively. For example, the circuits may comprise comparators thresholded at various levels, and the circuits may determine the voltage of the respective pulses by comparing the pulse's voltage to one or more threshold voltages.

In one embodiment, the circuits comprise at least three thresholds and optionally temporal means for discrimination, for example. In this way, the circuit may better discern the timeliness, for example, and energy spectrum of the pulse(s) it receives or narrow the energy spectrum of the pulse (e.g., relative to the capabilities with one or two thresholds).

At 910, information related to the identified characteristics of the first pulse and the second pulse is combined to determine a characteristic of the photon (e.g., the photon's energy level). That is, if a data acquisition component determines that the first and second pulses have coincidence and are generated by a single photon, the data acquisition component may combine information related to the first and second pulses. In this way, the photon may be categorized appropriately (e.g., as a high energy photon or a low energy photon) despite the photon's charge being shared amongst two or more pixels.

The method ends at 912.

Figure 10:
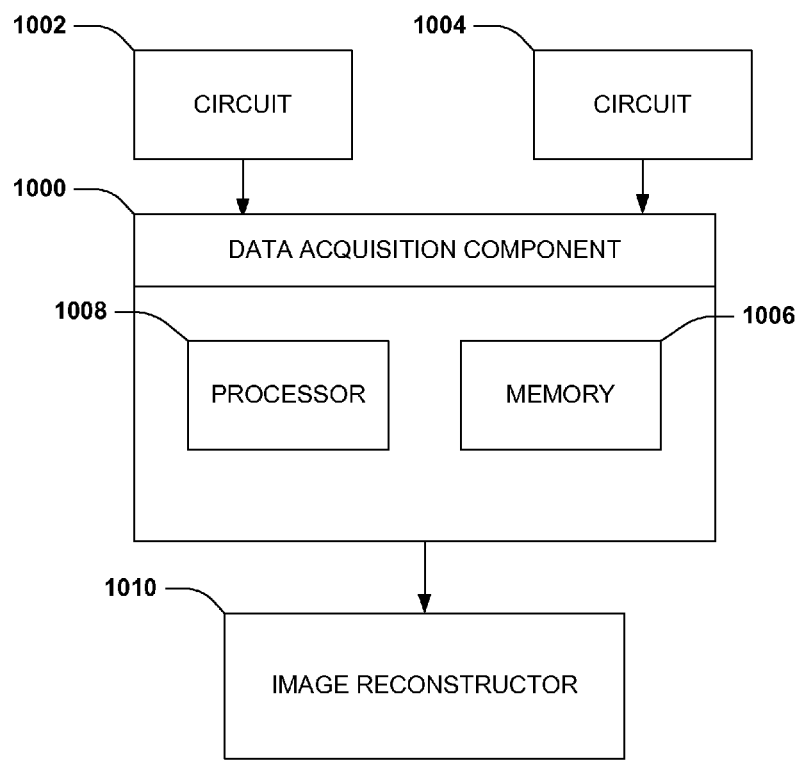
FIG. 10 illustrates an example data acquisition component.

FIG. 10 illustrates an example data acquisition component 1000 (e.g., 128 in FIG. 1). The data acquisition component 1000 is configured to receive circuit output from a plurality of circuits (e.g., 126 and 127) and generate projection data in response thereto. Thus, for example, the data acquisition component 1000 may be configured to generate projection space data of an object under examination (e.g., 104 in FIG. 1) based upon the output received from the circuits within a given period of time.

The data acquisition component 1000 may also be used in conjunction with the circuits to determine the photon energy of a photon that struck a detector (e.g., 116 in FIG. 1). For example, with charge sharing, a single circuit may be unable to identify the true energy level of a photon that struck a detector (e.g., 116 in FIG. 1), because the photon's charge is shared amongst a plurality of pixels. In one example, the data acquisition component 1000 comprises memory 1006 that is configured to store a counting logic. The counting logic, implemented on a processor 1008, uses discrimination rules to determine when circuit outputs received from a plurality of circuits, or data derived from the circuit outputs, should be combined to determine the photon energy of a photon that struck the detector and/or correct for miscounted photons.

In one embodiment, the discrimination rules that the counting logic may use to correct for charge sharing are as follows. First, the data acquisition component 1000 determines whether the comparators of a circuit 1002 associated with a first pixel (e.g., 804 in FIG. 8) and the comparators of one or more circuits (e.g., 1004 in FIG. 10) for pixels adjacent the first pixel (e.g., 802 in FIG. 8) are at a clear condition (e.g., 824 in FIG. 8). That is, the data acquisition component 1000 verifies that the circuits have not identified a pulse. If this is verified, the data acquisition component 1000 designates one of the pixels as the primary cell. Generally, the terms "primary cell" refer to a pixel associated with the circuit that first identified a pulse. Once a pixel is designated as the primary cell, the data acquisition component 1000 may determine whether the comparators of the circuits for pixels adjacent the first pixel (e.g., secondary cells) have identified a pulse within a first predetermined time period (e.g., 1/λ) of the primary cell. If one or more circuits associated with the secondary cells have identified a pulse, the data acquisition component 1000 may verify that the circuits identifying a pulse return to a clear condition within a second predetermined time period (e.g., 1/λ). If the circuits associated with the secondary cells do not return to the clear condition within the second predetermined time period (e.g., 1/λ), the data acquisition component 1000 may determine that the primary cell and the one or more secondary cells detected separate events (e.g., a photon struck each cell) and count the events separately.

Figure 11:
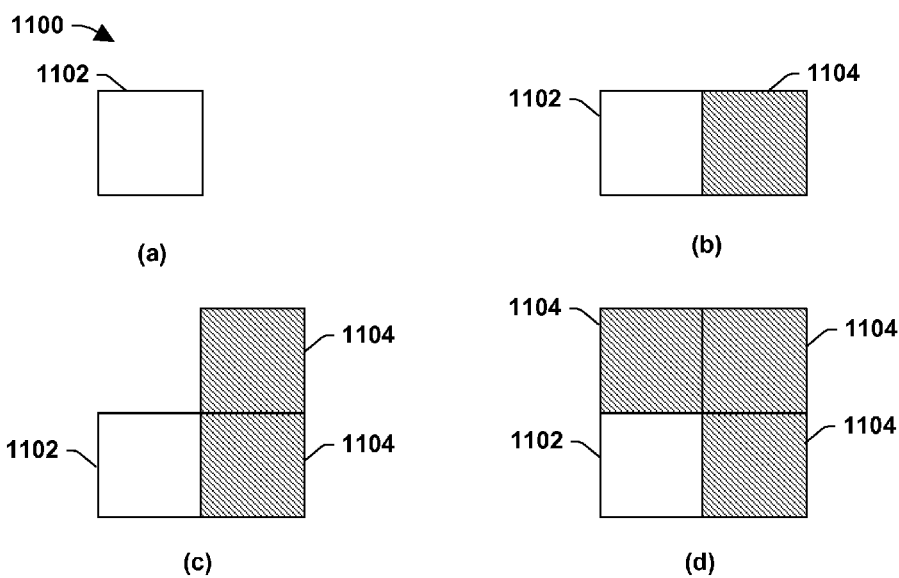
FIG. 11 illustrates example charge sharing patterns.

If the circuits do return to a clear condition within the predetermined time period, the data acquisition component 1000 may create a correction scheme based upon the number of secondary cells (e.g., one, two, or three adjacent pixels). FIG. 11 illustrates examples patterns 1100 of charge sharing that may be identified and corrected for by a data acquisition component (e.g., 128 in FIG. 1). It will be appreciated that the pattern will depend upon where on a pixel the photon strikes and/or whether one or more adjacent pixels detect a large enough amount of charge that it causes it to generate a pulse with enough energy to exceed at least one threshold (e.g., causing the comparator to detect the pulse as a photon rather than ignore the pulse as noise). That is, an adjacent pixel becomes a secondary cell when a threshold, indicative of a photon strike, has been triggered.

The primary cell 1102 (e.g., the pixel that the photon actually struck) is depicted without shading. Secondary cells 1104 that detect charge and generate a pulse indicative of a photon strike are shaded. In FIG. 11(a) there is no charge sharing, or rather there is not enough charge shared to cause an adjacent pixels to generate a pulse indicative of a photon strike (e.g., adjacent pixels may generate small pulses, but the pulse will not have enough energy to indicate a pulse strike). FIG. 11(b) illustrates a pattern in which one adjacent pixel detects charge from a photon that struck the primary pixel 1102 and generates a pulse indicative of a photon (e.g., there is one secondary cell 1104). FIG. 11(c) illustrates a pattern in which two adjacent pixels detect charge from a photon that struck the primary pixel 1102 and generate a pulse indicative of a photon (e.g., there are two secondary cells 1104). FIG. 11(d) illustrates a pattern in which three secondary cells 1104 detect charge from a photon that struck the primary pixel 1102 and generate a pulse indicative of a photon (e.g., there are three secondary cells).

Returning to FIG. 10, the data acquisition component 1000 may combine the data related to the secondary cells with the data related to the primary cell. That is, the data acquisition component 1000 may subtract the data that was received from the secondary cell(s) and add it to the data that was received from the primary cell. In this way, the data acquisition component 1000 may determine the actual energy spectrum of a photon whose energy was shared amongst a plurality of pixels.

Once the data acquisition component 1000 determines the energy spectrum of a photon, data related to the photon may be combined with data related to other photons to generate projection data related to the object. The projection data may be transmitted to an image reconstructor 1010 that uses the projection data to generate image space data (e.g., generating an image of an object under examination).

Figure 12:
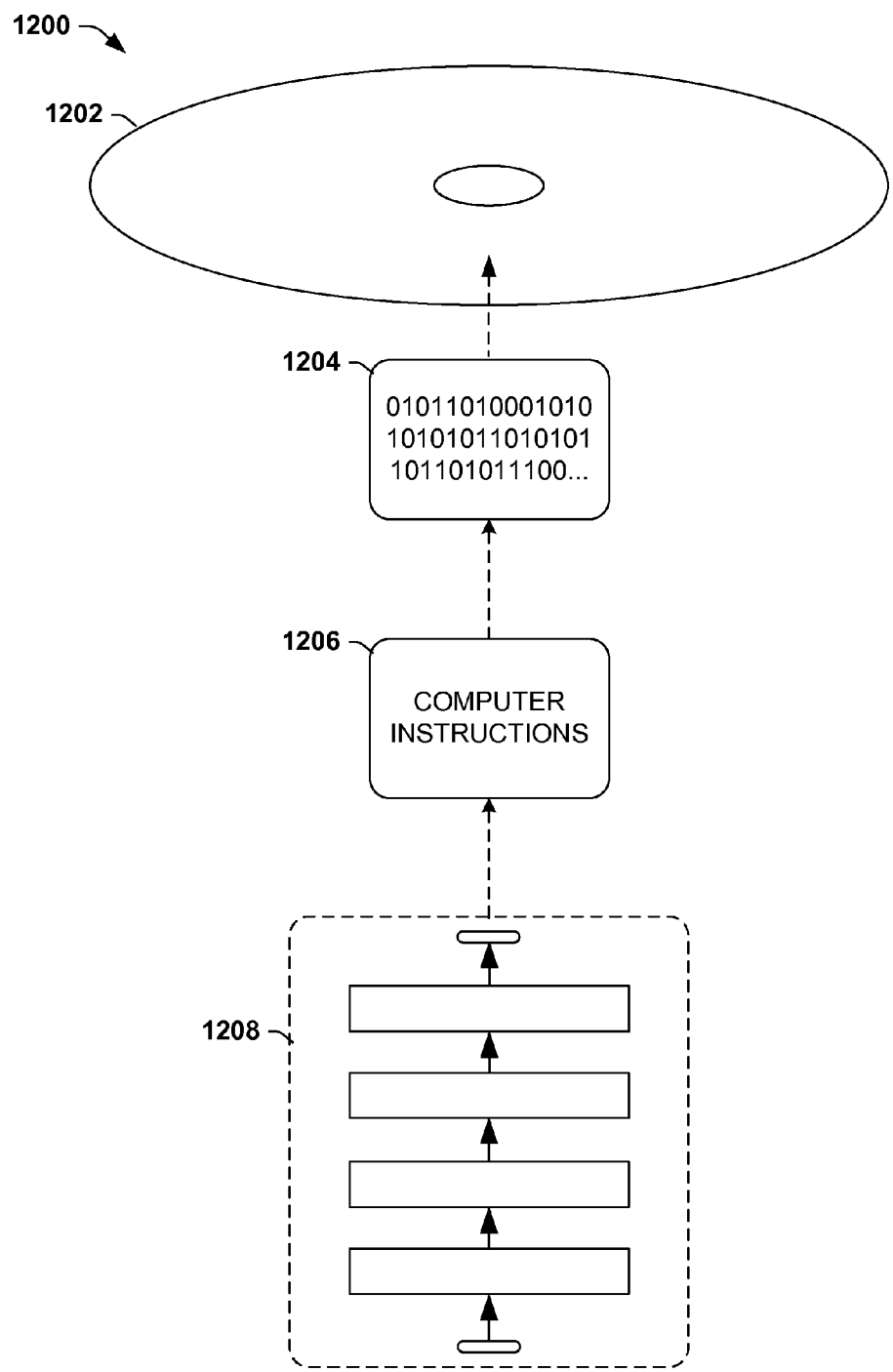
FIG. 12 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 12, wherein the implementation 1200 comprises a computer-readable medium 1202 (e.g., a CD-R, DVD-R, or a platter of a hard disk drive), on which is encoded computer-readable data 1204. This computer-readable data 1204 in turn comprises a set of computer instructions 1206 configured to operate according to one or more of the principles set forth herein. In one such embodiment 1200, the processor-executable instructions 1206 may be configured to perform a method, such as the portions of the exemplary method 400 of FIG. 4 or exemplary method 900 of FIG. 9, for example. In another such embodiment, the processor-executable instructions 1206 may be configured to implement a system, such as at least some of the exemplary scanner 100 of FIG. 1, for example. Many such computer-readable media may be devised by those of ordinary skill in the art that are configured to operate in accordance with the techniques presented herein.

It will be appreciated that there are numerous benefits to the system and methods herein disclosed. For example, because the system uses circuits, rather than software, to identify charge sharing and/or pulse pile-up, less noise is attained, thereby improving image resolution. Additionally, the circuits may allow the photon count rate to be increased without degrading image resolution. Therefore, energy counting scanners may be utilized for applications that require a high photon count rate, for example.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A multi-energy imaging apparatus comprising:
a first circuit configured to identify an energy of a first pulse emitted from an energy resolving detector and to emit a first circuit output indicative of the energy, the first circuit comprising at least three comparators, a first comparator thresholded at a level indicative of a low energy radiation event, a second comparator thresholded at a level indicative of a higher energy radiation event, and a third comparator thresholded at at least one of:
a level below the level indicative of the low energy radiation event, or
a level greater than the level indicative of the higher energy radiation event; and
a data acquisition component operably coupled to the first circuit and configured to identify at least one of charge sharing or pulse pile-up based upon the first circuit output and to correct for the at least one of charge sharing or pulse pile-up.

2. The apparatus of claim 1, wherein the level greater than the level indicative of the higher energy radiation event is above an attainable energy level of a pulse that is produced when a single photon of radiation is detected given an input spectrum supplied to a radiation source emitting the radiation.

3. The apparatus of claim 1, wherein the level greater than the level indicative of the higher energy radiation event is indicative of pulse pile-up.

4. The apparatus of claim 1, wherein the data acquisition component is operably coupled to a second circuit and is configured to receive a second circuit output indicative of an identified energy of a second pulse.

5. The apparatus of claim 4, wherein the data acquisition component is configured to identify charge sharing when the first circuit output and the second circuit output have temporal coincidence.

6. The apparatus of claim 4, wherein the data acquisition component is configured to correct for charge sharing by combining data yielded from the first circuit output and data yielded from the second circuit output when charge sharing is identified.

7. The apparatus of claim 1, wherein the data acquisition component is configured to identify pulse pile-up when the first circuit output indicates that the first pulse has an energy that exceeds the threshold of the third comparator when the third comparator is thresholded at the level greater than the level indicative of the higher energy radiation event.

8. The apparatus of claim 7, wherein the data acquisition component is configured to correct for pulse pile-up by applying one or more correction factors to data yielded from the first circuit output.

9. The apparatus of claim 8, wherein the one or more correction factors are a function of at least one of a material of the energy resolving detector or a shaper impulse response.

10. The apparatus of claim 1, where the level below the level indicative of the low energy radiation event is utilized to identify charge sharing and the level greater than the level indicative of the higher energy radiation event is utilized to identify pulse pile-up.

11. A method for determining a characteristic of a photon, comprising:
receiving a first pulse generated by a first pixel of a pixelated radiation detector and a second pulse generated by a second pixel of the pixelated radiation detector, the first pulse and the second pulse generated responsive to a radiation event;

identifying, by a first circuit operably coupled to the first pixel, a characteristic of the first pulse;

identifying, by a second circuit operably coupled to the second pixel, a characteristic of the second pulse;

determining whether the second circuit received the second pulse within a first predetermined time period of the first circuit receiving the first pulse; and combining information related to the characteristic of the first pulse and information related to the characteristic of the second pulse when the second circuit received the second pulse within the first predetermined time period of the first circuit receiving the first pulse to determine a characteristic of the radiation event.

12. The method of claim 11, a charge associated with the radiation event shared between the first pixel and the second pixel.

13. The method of claim 11, the identifying a characteristic of the first pulse comprising comparing the first pulse to at least three voltage thresholds.

14. The method of claim 13, the identifying a characteristic of the second pulse comprising comparing the second pulse to the at least three voltage thresholds.

15. The method of claim 11, the radiation event corresponding to a detection of an ionizing radiation photon.

16. The method of claim 11, before the combining, comprising:

determining whether the second circuit returned to a clear condition within a second predetermined time period of the first circuit returning to the clear condition.

17. The method of claim 16, the combining comprising combining the information related to the characteristic of the first pulse and the information related to the characteristic of the second pulse responsive to determining that the second circuit returned to the clear condition within the second predetermined time period.

18. A method comprising:

receiving a pulse emitted from an energy resolving detector responsive to a radiation event; and comparing the pulse to at least three thresholds to generate a first circuit output, where:
 a first threshold corresponds to a minimum threshold for a low energy radiation event,
 a second threshold corresponds to a minimum threshold for a higher energy radiation event, and
 a third threshold corresponds to at least one of:
  a minimum threshold for a charge sharing event wherein a charge associated with the radiation event is shared between at least two pixels of the energy resolving detector, or
  a maximum threshold for the higher energy radiation event.

19. The method of claim 18, where the third threshold corresponds to the maximum threshold for the higher energy radiation event and the method comprises:

identifying pulse pile-up when the first circuit output indicates that an energy of the pulse exceeds the third threshold.

20. The method of claim 18, where the third threshold corresponds to the minimum threshold for a charge sharing event and the method comprises:

identifying charge sharing when the first circuit output indicates that an energy of the pulse exceeds the third threshold but does not exceed the first threshold or the second threshold.

21. The method of claim 18, an energy of the pulse a function of an energy of the radiation event.

22. A system for determining a characteristic of a photon, comprising:

a first circuit operably coupled to a first pixel of a pixelated radiation detector and configured to:
 receive a first pulse generated by the first pixel responsive to a radiation event, and
 determine a characteristic of the first pulse;

a second circuit operably coupled to a second pixel of the pixelated radiation detector and configured to:
 receive a second pulse generated by the second pixel responsive to the radiation event, and
 determine a characteristic of the second pulse; and a data acquisition component operably coupled to the first circuit and the second circuit and configured to:
 determine whether the second circuit returned to a clear condition within a predetermined time period of the first circuit returning to the clear condition, and
 combine information related to the characteristic of the first pulse and information related to the characteristic of the second pulse when the second circuit returned to the clear condition within the predetermined time period of the first circuit returning to the clear condition to determine a characteristic of the radiation event.

23. The system of claim 22, a charge associated with the radiation event shared between the first pixel and the second pixel.

* * * * *